(12) United States Patent
Bastard et al.

(10) Patent No.: US 6,651,700 B1
(45) Date of Patent: Nov. 25, 2003

(54) DEVICE FOR LIMITING PROPAGATION OF DEFORMATION IN A WOUND DOUBLE-WALLED TUBE

(75) Inventors: Antoine Bastard, Thiberville (FR); Jeroen Remery, Rouen (FR)

(73) Assignee: Coflexip (FR)

( * ) Notice: Subject to any disclaimer, the term of this patent is extended or adjusted under 35 U.S.C. 154(b) by 128 days.

(21) Appl. No.: 10/018,519
(22) PCT Filed: Jun. 13, 2000
(86) PCT No.: PCT/FR00/01633
§ 371 (c)(1), (2), (4) Date: Dec. 13, 2001
(87) PCT Pub. No.: WO01/02767
PCT Pub. Date: Jan. 11, 2001

(30) Foreign Application Priority Data

Jul. 2, 1999 (FR) .............................. 99 08540

(51) Int. Cl.⁷ .................................................. F16L 9/00
(52) U.S. Cl. ........................ 138/172; 138/148; 138/114; 138/112; 138/108; 405/168.2
(58) Field of Search ................................ 138/172, 108, 138/109, 112, 114, 148; 405/168.2

(56) References Cited

U.S. PATENT DOCUMENTS

| | | | |
|---|---|---|---|
| 2,425,800 A | 8/1947 | Hamilton, Jr. ............... | 153/32 |
| 3,747,356 A | 7/1973 | Lochridge et al. ........... | 61/72.3 |
| 3,768,269 A | 10/1973 | Broussard et al. ........... | 61/72.3 |
| 4,233,816 A * | 11/1980 | Hensley ...................... | 62/50.7 |
| 4,364,692 A | 12/1982 | Kyriakides et al. ......... | 405/168 |
| 4,570,679 A * | 2/1986 | Schippl ....................... | 138/149 |
| 5,433,252 A * | 7/1995 | Wolf et al. .................. | 138/113 |
| 5,791,379 A * | 8/1998 | Piorkowski .................. | 138/110 |
| 5,803,127 A | 9/1998 | Rains ........................... | 138/113 |
| 5,865,378 A | 2/1999 | Hollinshead et al. ...... | 239/587.1 |

FOREIGN PATENT DOCUMENTS

FR 2406747 5/1979

OTHER PUBLICATIONS

"Specification for Unbonded Flexible Pipe", *American Petroleum Institute*, Dec. 1996, API Specification 17J, pp. 1–45.

"Recommended Practice for Flexible Pipe", *American Petroleum Institute*, Jul. 1998, API Recommended Practice 17B, pp. 1–134.

"Recommended Practice For Design and Operation of Subsea Production Systems", *American Petroleum Institute*, Sep. 1987, API Recommended Practice 17A (RP 17A), pp. 6–86.

* cited by examiner

*Primary Examiner*—Patrick Brinson
(74) *Attorney, Agent, or Firm*—Ostrolenk, Faber, Gerb & Soffen, LLP

(57) ABSTRACT

A device for eliminating propagation of a buckle in the outer wall of a double-walled tube, where the double-walled tube comprises an outer pipe, an inner pipe and an annular space between them in which the deformable element is disposed with the external surface of the deformable element in contact with the internal wall of the outer pipe and the interior of the deformable element being spaced outward from the inner pipe and having a sheath on the interior of the deformable element. The deformable element may be a wound wire, a profiled wire, an interlocked wire with interlocked turns, a non-interlocked wire, a spring with turns urged outwardly or reinforcement with turns urged outwardly and bearing blocks in the annular space on the inner pipe for at least one end of the reinforcement.

15 Claims, 2 Drawing Sheets

DEVICE FOR LIMITING PROPAGATION OF DEFORMATION IN A WOUND DOUBLE-WALLED TUBE

The present invention relates to a device for arresting the propagation of a buckle in a double-walled pipe wound onto a reel and more particularly in a rigid pipe used for transporting fluids such as hydrocarbons.

A rigid pipe or tube is laid on the seabed usually from what is called a pipelaying vessel. The laying is called S-laying when the pipe adopts the shape of an S between the pipelaying vessel and the seabed and it is called J-laying when the pipe adopts the shape of a J. In the latter case, a guide ramp is provided on the pipelaying vessel, which ramp may sometimes be partially immersed in the water.

The rigid pipe to be laid is stored on the pipelaying vessel either in pipe sections of a given but relatively short length, the pipe sections being joined together as the laying progresses, or it is wound as a great length on a reel, the pipe then being unreeled from the said reel during the laying operation. These laying operations are described in the API (American Petroleum Institute) document "Recommended Practice 17 A" from 1987.

When the pipe has left the vessel and while the said pipe is being laid, it is important that the latter undergoes no plastic deformation in bending, which would result in ovalization of the pipe, the said ovalization causing a "weak singularity" which would be conducive to the initiation of a collapse. Moreover, when the pipe is laid on the seabed at great water depths (typically greater than 300 m and possibly up to 2000 m and more), the hydrostatic pressure exerted on the pipe may be sufficient to initiate a buckle which has a tendency to propagate along the pipe, in both directions. Of course, the buckle will form preferentially at a "weak singularity" when one exists on the pipe. When the buckle occurs, it is then necessary to replace at least that section or portion of the pipe comprising the buckled or collapsed region.

To prevent the propagation of a local buckle or buckles, it has been proposed to provide the pipe with certain devices or means, called buckle arrestors.

Such buckle arrestors are described in the U.S. Pat. Nos. 2,425,800, 3,747,356, 3,768,269 and 4,364,692.

The process in U.S. Pat. No. 3,747,356 consists in linking a cylinder to a cable, in lodging the cylinder inside a pipe section and then in simultaneously unreeling the pipe and the cable so as to keep the cylinder in the pipe section while the latter is being laid, until the pipe comes into contact with the seabed. The cylinder is then brought back up so as to be lodged in another pipe section to be laid, which is joined to the previous section. Consequently, any buckle likely to occur, when laying the pipe, between the pipelaying vessel and the seabed is immediately arrested and therefore not allowed to propagate along the pipe sections. However, such an arrangement provides no solution to or any effectiveness in arresting buckles likely to be propagated after the pipe has been finally laid on the seabed.

U.S. Pat. No. 3,768,269 proposes to locally increase the stiffness of the pipe by placing, at regular intervals, for example at intervals ranging between 100 m and 500 m, reinforcing collars whose length ranges between 1 m and 2.5 m. Such a solution is valid only for pipes laid in sections since the reinforcing collars can be mounted and fastened in the factory to the pipe sections and then transported by the pipelaying vessel to the laying site. When the pipe is long and wound onto a storage reel, it then becomes virtually impossible to wind the pipe with its reinforcing collars onto a reel since they would result in straight or almost straight portions that cannot be deformed when winding the pipe onto the storage reel. In order to mitigate this difficulty, it is conceivable to mount and fasten the reinforcing collars during the laying operations. However, it would then be necessary to interrupt the laying, at regular intervals, so as to mount and fasten the reinforcing collars.

In order to allow the pipe to be wound onto a reel, U.S. Pat. No. 4,364,692 proposes to wind a rod tightly around the pipe so as to form a certain number of turns which can be welded at their ends to the rod itself and/or to the pipe.

According to another embodiment, the turns may be individual turns, by welding their two ends and regularly spacing them apart along that portion of the pipe to be reinforced. As long as the pipe is a single-walled pipe, the increase in the diameter in the reinforced portions may be acceptable. However, when the pipe is of the double-walled or pipe-in-pipe type, that is to say comprising an inner pipe, or liner pipe, and an outer pipe, or carrier pipe, which is slipped over the inner pipe, the increase in the diameter of the outer pipe is unacceptable when transporting and storing long lengths of double-walled pipes.

The object of the present invention is to provide a device for arresting the propagation of a buckle in a double-walled rigid tube or pipe that can be wound onto a reel intended to be stored on a pipelaying vessel or equivalent system, such as a barge, floating platform, etc.

The subject of the present invention is a device which consists of at least one element having symmetry of revolution and being deformable in a direction transverse to the longitudinal axis, said deformable element being placed in the annular space and having an external face which is in contact with the internal wall of the outer pipe, at least at two points, and an internal face which is spaced away from the inner pipe.

One advantage of the present invention lies in the fact that the double-walled pipe retains its external dimensions without any local increase in its outside diameter, while still being sufficiently flexible to be wound onto a take-up reel.

Another advantage is that it is possible to factory-mount the device in the outer pipe before it is positioned around the inner pipe.

Another advantage lies in the fact that the device according to the invention can be lodged in the annular space without modifying the internal arrangement of the double-walled pipe, which generally includes spacers and thermal insulation members.

According to another characteristic of the present invention, the deformable element consists of a core comprising a plastic sheath onto which is wound, with a short pitch, an interlocked or non-interlocked profiled wire, which may constitute a reinforcement similar to an internal carcass or to a pressure vault or a hoop, such as those used in what is called a "rough bore" or "smooth bore" flexible pipe depending on whether the innermost member of said flexible pipe consists of an inner polymeric sealing sheath or a metal carcass, the structures of such flexible pipes being well-known to experts and described in the API (American Petroleum Institute) documents 17B or 17J from 1988 or 1997, these being included in the description as references.

One advantage of this feature is that it is unnecessary to manufacture a special core, as this is available at the flexible pipe manufacturers and all that is required is to cut the available cores to the desired length and to place them in the outer pipe at the manufacturing premises. In addition, the plastic of the sheath is carefully selected in order to form a thermal barrier, so as to improve the thermal insulation at the buckle propagation arrestor.

Further advantages and features of the present invention will become more clearly apparent on reading the description of several embodiments, together with the appended drawings in which.

Figure 1:
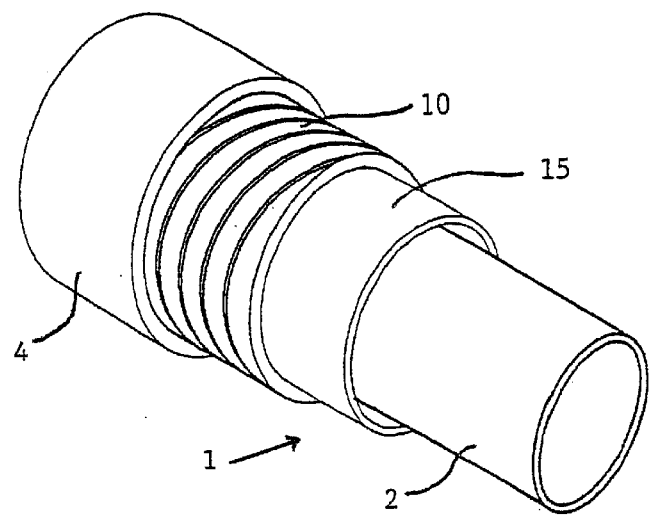
FIG. 1 is a schematic and partial cross-sectional representation of a double-walled pipe provided with the device according to a first embodiment of the invention.
Figure 2:
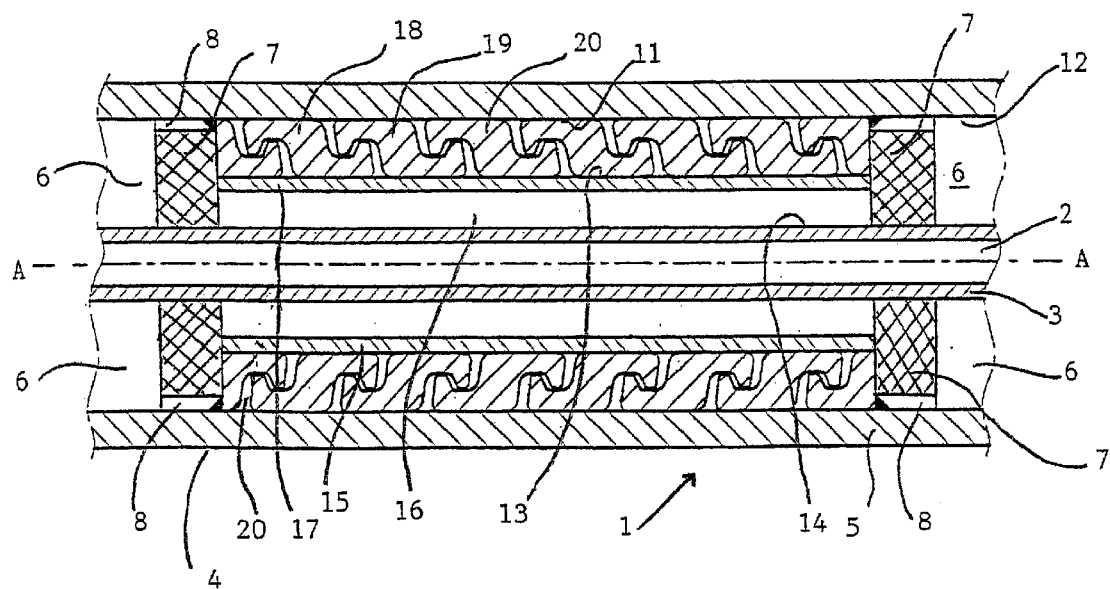
FIG. 2 is a schematic, partial and perspective view of the deformable element used without a polymeric sheath.

According to a first embodiment shown in FIGS. 1 and 2, the rigid pipe 1 according to the invention, of longitudinal axis AA, is of the double-walled type and comprises a cylindrical inner pipe 2, the thickness of the wall 3 of which and the diameter and nature of the material of which are chosen according to the conditions of use, which are generally, without these being limiting, the temperature and the pressure of the fluid flowing in the inner pipe. An outer pipe 4 (or carrier pipe) has a diameter large enough to allow it to slide over the inner pipe 1 and with a thickness of the wall 5 which is able to withstand the external or ambient pressure within the medium in which the rigid pipe is immersed. Typically, an annular space 6 is provided between the inner pipe 2 and the outer pipe 4 and is of the order of several centimeters measured radially from the external face of the inner pipe 2 to the internal wall of the outer pipe 4. In a double-walled rigid pipe like the one briefly described above, spacers are provided over the entire length of the rigid pipe, at regular intervals, between the inner and outer pipes. These spacers leave, at their upper end, that which is closest to the internal wall of the outer pipe, a small space 8 to allow the outer pipe 4 to slide over the inner pipe 2, within the manufacturing tolerances. Likewise, a thermal insulation is placed around the inner pipe 2, between the spacers.

According to the present invention, one or more flexible devices are provided over the entire length of the rigid pipe at predetermined intervals, these flexible devices being able to constitute members for arresting the propagation of a buckle likely to occur in the outer pipe 4. Each device comprises, in the embodiment shown in FIGS. 1 and 2, at least one deformable element 10 which is placed in the annular space 6 and the external face 11 of which is in contact with the internal wall 12 of the outer pipe, at least at two points but preferably over the entire length of the external face 11, and the internal face 13 of which is a certain distance from the external wall 14 of the inner pipe 2. The device also includes a sheath, for example the polymeric sheath 15, which is applied to the internal face 13 of the deformable element 10, the thickness of the sheath 15 being such that a space 16 is left between its internal face 17 and the external wall 14 of the inner pipe 2. The sheath 15, which may be impermeable, is used as a thermal barrier in order to provide improved thermal insulation.

The deformable element 10 is, for example, made from an interlocked or non-interlocked profiled wire such as that shown in FIG. 2, the consecutive turns 18 and 19 leaving between them an inter-turn gap 20 which helps the deformable element 10 to deform in curvature while the rigid pipe 1 is being wound onto a reel (not shown).

The length of the deformable element 10 is between 0.5 m and 5 m and may be bounded by two correctly spaced stops 7.

The deformable element 10/sheath 15 assembly constitutes a core which is used, in standard flexible pipes, as a pressure vault and inner sheath. Consequently, this core, which is available at flexible pipe manufacturers, can be used, cut to the desired length, inserted into the outer pipe 4 and then fastened by any suitable means to the internal wall 12 of said outer pipe 4. Among suitable fastening means, at least one end turn and preferably the first and last turns of the deformable element 10 can be welded to the internal wall 12 of the outer pipe 4.

Figure 3:
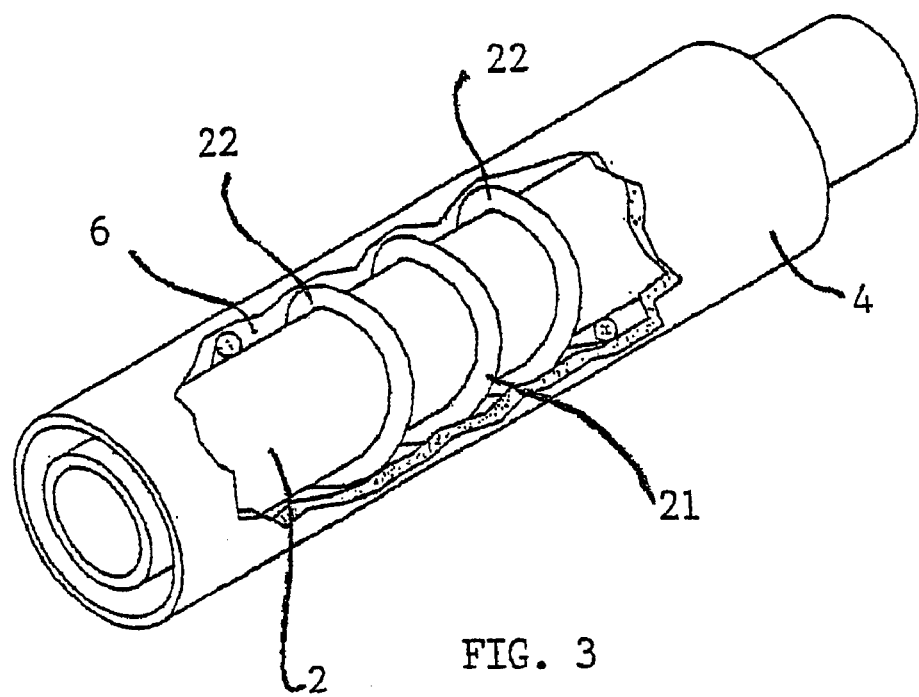
FIG. 3 is a partially cut-away perspective view of part of a double-walled pipe according to a second embodiment of the device according to the invention.

In another embodiment shown in FIG. 3, the arrestor device according to the invention may consist of a spring 21 which is wound around the inner pipe 2 without any contact with the latter, at least some of the turns 22 of the spring 21 being in permanent contact with the internal wall of the outer pipe 4. The spring 21 may be placed in the annulus 6 of the rigid pipe 1 in a variety of ways. In one example, it is preferable to mount the spring 21 in the outer pipe 4 by welding at least two of the turns, especially the outermost turns, to the internal wall of the outer pipe 4 and then to slide the latter, with its uniformly distributed springs, over the inner pipe 2 in the usual manner. It would also be possible to insert the springs 21 one after another in prestressed form into the outer pipe so that, on relaxing, each spring 21 comes into contact with the internal wall of the outer pipe 4 and without any possibility of it slipping when the rigid pipe 1 is being wound onto the take-up reel. It would also be possible for the deformable element to constitute a reinforcement which would be twisted before its insertion into the annular space and which, after insertion, would be capable of resuming its initial state so that the external face comes into permanent contact with the internal wall of the outer pipe, said reinforcement consisting of a helical winding of an interlocked or non-interlocked profiled wire, of the type used to produce a pressure vault, an internal carcass or a hoop.

To keep said reinforcement in place, several means may be envisioned. As previously, it is possible to let the reinforcement relax and come into permanent contact with the internal wall of the outer pipe or to weld one or both end turns of the reinforcement to said internal wall. Another means consists in fastening, at predetermined points on the internal wall, blocks on which at least one of the end turns of the reinforcement will bear.

What is claimed is:

1. A pipe buckle arresting device for a double-walled rigid pipe, wherein the double-walled pipe is rigid and comprises an outer pipe having a longitudinal axis, an inner pipe of smaller diameter than the outer pipe and disposed in the inner pipe, the outer pipe having an inner surface, the inner pipe having an outer surface, an annular space between the inner surface of the outer pipe and the outer surface of the inner pipe;

the buckle arresting device comprising:

at least one element having symmetry of revolution and being deformable in a direction transverse to the longitudinal axis of the pipe, the deformable element being disposed in the annular space and having an external face in contact with the inner wall of the outer pipe at at least two points along the outer pipe; the element being sized within the annular space as to be out of contact with the outer surface of the inner pipe.

2. The device of claim 1, further comprising a sheath in the annular space at least partially covering the inner surface of the outer pipe.

3. The device of claim 2, wherein the at least one deformable element comprises a profiled wire comprised of an interlocked wire.

4. The device of claim 1, wherein the at least one deformable element comprises a profiled wire comprised of an interlocked wire.

5. The device of claim 2, wherein the deformable element comprises a profiled wire comprised of a non-interlocked wire.

6. The device of claim 5, wherein the profiled wire is spirally wound around the axis.

7. The arresting device of claim 1, wherein the deformable element comprises a spiral winding of a profiled wire.

8. The arresting device of claim 7, wherein the profiled wire has a plurality of turns including end turns, and at least one of the end turns is fastened to the inner surface of the outer pipe.

9. The arresting device of claim 2, wherein the sheath is a polymeric sheath which acts as a thermal barrier.

10. The device of claim 7, wherein the profiled wire has a length in the axial direction of the pipe of between 0.5 and 5 m.

11. The device of claim 1, wherein the deformable element has a length in the axial direction along the pipe of between 0.5 m and 5 m.

12. The arresting device of claim 2, wherein the sheath and inner pipe are respectively so shaped and sized as to leave an annular gap between the sheath and the inner pipe sufficient for allowing the inner pipe to slide axially in the outer pipe.

13. The device of claim 1, wherein the deformable element comprises a radially expandable spring lodged in the annular space and around the inner pipe, the spring having a plurality of spring turns and the spring being expandable for causing at least some of the spring turns to contact the inner surface of the outer pipe.

14. The device of claim 1, wherein the deformable element comprises a reinforcement which is twistable to enable its insertion into the annular space and which after the twist thereof is relieved, it is capable of recovering an initial shape and state and having an external face that comes into contact with the inner surface of the outer pipe when the deformable element recovers its initial shape.

15. The arresting device of claim 14, further comprising bearing blocks fastened to the inner surface of the outer pipe at spaced intervals along the outer pipe and the reinforcement including a plurality of turns around the inner pipe in the annular space including at least one end turn of the reinforcement bearing against at least one of the bearing blocks.

* * * * *